US010681557B2

(12) United States Patent
Astely et al.

(10) Patent No.: US 10,681,557 B2
(45) Date of Patent: Jun. 9, 2020

(54) CELL OPERATION IN A WIRELESS COMMUNICATIONS NETWORK

(71) Applicant: Telefonaktiebolaget LM Ericsson (publ), Stockholm (SE)

(72) Inventors: David Astely, Bromma (SE); Henrik Asplund, Stockholm (SE); Niklas Jaldén, Enköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 130 days.

(21) Appl. No.: 15/759,456

(22) PCT Filed: Oct. 23, 2015

(86) PCT No.: PCT/EP2015/074684
§ 371 (c)(1),
(2) Date: Mar. 12, 2018

(87) PCT Pub. No.: WO2017/067618
PCT Pub. Date: Apr. 27, 2017

(65) Prior Publication Data
US 2018/0184300 A1    Jun. 28, 2018

(51) Int. Cl.
*H04L 12/801*        (2013.01)
*H04L 12/24*         (2006.01)
(Continued)

(52) U.S. Cl.
CPC .......... *H04W 16/04* (2013.01); *H04W 16/10* (2013.01); *H04W 24/04* (2013.01); *H04W 24/10* (2013.01);
(Continued)

(58) Field of Classification Search
CPC ..... H04W 16/04; H04W 16/22; H04W 16/10; H04W 24/04; H04W 24/10; Y02D 70/00; Y02D 70/124; H04B 17/318
See application file for complete search history.

(56) References Cited

U.S. PATENT DOCUMENTS 9,451,486 B2 *   9/2016  Fonseca Dos Santos ...................
                                                H04W 24/08
2008/0058613 A1 *  3/2008  Lang ..................... G06T 7/0012
                                                       600/300
(Continued)

FOREIGN PATENT DOCUMENTS

EP    2 056 628 A1    5/2009
EP    2 538 713 A1   12/2012
(Continued)

OTHER PUBLICATIONS

Hybrid OAM and signalling based approach for E-UTRAN cell waking up frm dormant mode, R3-111298, publication date May 17-21, 2011 (Year: 2011).*
(Continued)

*Primary Examiner* — Brian S Roberts
*Assistant Examiner* — Abusayeed M Haque
(74) *Attorney, Agent, or Firm* — Patent Portfolio Builders, PLLC

(57) ABSTRACT

Operations by a wireless communication network include obtaining information of available cell resources of cells in at least a segment of the wireless communications network, and the current operation state of each cell in the segment. The operations further include obtaining a current traffic demand in the segment, and obtaining previously stored spatial channel characteristics for wireless devices being associated with the cells in the segment. The spatial channel characteristics for at least one wireless device of the wireless device is given between the at least one wireless device and (Continued)

at least two cells in the segment. A determination is then made whether to affect the operation state of at least one of the cells or not according to the information of available cell resources, the current traffic demand, and the previously stored spatial channel characteristics.

23 Claims, 5 Drawing Sheets

(51) Int. Cl.
| | |
|---|---|
| H04L 5/14 | (2006.01) |
| H04L 29/06 | (2006.01) |
| H04W 16/04 | (2009.01) |
| H04W 52/02 | (2009.01) |
| H04W 16/10 | (2009.01) |
| H04W 24/04 | (2009.01) |
| H04W 24/10 | (2009.01) |
| H04W 28/16 | (2009.01) |
| H04W 48/16 | (2009.01) |
| H04B 17/318 | (2015.01) |
| H04B 7/06 | (2006.01) |

(52) U.S. Cl.
CPC ........... *H04W 28/16* (2013.01); *H04W 48/16* (2013.01); *H04W 52/0206* (2013.01); *H04B 7/0626* (2013.01); *H04B 17/318* (2015.01); *Y02D 70/00* (2018.01); *Y02D 70/1262* (2018.01)

(56) References Cited

U.S. PATENT DOCUMENTS

2015/0103742 A1\* 4/2015 Onodera ............... H04W 16/08 370/328
2015/0181492 A1\* 6/2015 Schmidt ................ H04W 36/30 455/443
2016/0065290 A1\* 3/2016 Zhu ...................... H04B 7/0417 370/329
2016/0295462 A1\* 10/2016 Lunden ................. H04W 76/28
2016/0316392 A1\* 10/2016 Pantelidou ............ H04W 48/02
2018/0124355 A1\* 5/2018 Perraud ............... H04W 36/023
2018/0255515 A1\* 9/2018 Gupta Hyde ......... H04W 88/08
2018/0338291 A1\* 11/2018 Herr ..................... H04W 24/02

FOREIGN PATENT DOCUMENTS

| WO | WO 2002/07464 A1 | 1/2002 |
| WO | WO 2016/055092 A1 | 4/2016 |
| WO | WO 2016/096001 A1 | 6/2016 |

OTHER PUBLICATIONS

International Search Report and Written Opinion of the International Searching Authority for International Application No. PCT/EP2015/074684 dated Jun. 21, 2016, 12 pages.
3GPP TR 36.927 1.0.0, "3rd Generation Partnership Project; Technical Specification Group Radio Access Networks; Evolved Universal Terrestrial Radio Access (E-UTRA); Potential solutions for energy saving for E-UTRAN (Release 10)", 3GPP Technical Report, Nov. 2010, 19 pages.
Telefónica, "Hybrid OAM and signalling based approach for E-UTRAN cell waking up from dormant mode", 3GPP TSG RAN WG3 Meeting #72; Agenda item: 19, R3-111298, Barcelona, Spain, May 17-21, 2011, 5 pages.

\* cited by examiner

CELL OPERATION IN A WIRELESS COMMUNICATIONS NETWORK

TECHNICAL FIELD

Embodiments presented herein relate to cell operation in a wireless communications network, and particularly to a method, a network node, a computer program, and a computer program product for cell operation in a wireless communications network comprising a plurality of cells providing network coverage in the wireless communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the coverage of the communications network.

In a first stage of the deployment of a communications network providing ubiquitous coverage, the operator may target to establish as large population coverage as possible so as to service as many wireless devices as possible. At a later stage, the operator may typically need to upgrade the communications network to meet an increasing traffic capacity demand. Such an upgrade procedure may commonly include providing existing radio access network nodes with new hardware, such as advanced antenna systems, adding mechanism for interference coordination, adding more frequency spectrum (e.g., by providing existing radio access network nodes with an increasing number of antennas as well as an increasing number of radio chains to handle the new spectrum, and adding more radio access network nodes.

Typically, the traffic capacity need in a communications network varies with time, and the operator may need to dimension the communications network to handle so-called busy hours when the traffic demand is the highest. Consider, as an illustrative non-limiting example, an office environment where there may be a need for high capacity during office hours, whereas the need may be much lower during night when only a fraction of the employees, if any, are present in the buildings. Similarly, during commute hours the capacity need may be high at a subway station; just as it may be high in a residential area in the evening, for example due to subscribers consuming streaming services in their homes.

Services may not be provided only by a single radio access technology (RAT). In fact, an operator may be expected to provide network coverage for multiple RATs, such as example Global System for Mobile Communications (GSM), Wideband Code Division Multiple Access (WCDMA), High Speed Packet Access (HSPA), and Long Term Evolution (LTE). In some communications networks, for each RAT, cells on multiple frequencies can be provided. This is illustrated in FIG. 1c. In FIG. 1c radio access network node, or site, 110a is configured to provide network coverage in a first cell 140a on a first carrier frequency f1 and in a second cell 140b on a second carrier frequency f2; radio access network nodes 110b and 110c are configured to provide network coverage in a respective further second cells 140b on the second carrier frequency f2; and radio access network nodes 110d and 110e are configured to provide network coverage in a respective third cell 140c on a third carrier frequency f3.

Radio access network nodes consume energy not only in active mode when serving wireless devices, but also in idle mode when no wireless devices are served. Technology development is expected to reduce power consumption and make the power consumption more directly proportional to the amount of traffic served. Further, the power consumption can be reduced by reducing the transmit power and even switching off a cell (as provided by one or more radio access network nodes) when there is no need for network coverage; when the capacity of a cell is not needed it can thus be switched off. At the same time, it is desirable to provide network coverage so that access to the communications network is available when needed. For example, with reference to the above illustrative non-limiting example, during night-time the need for network capacity for providing streaming services can be low, but the need for network coverage to provide voice services may still be high.

In U.S. Pat. Nos. 9,030,983B2 and 8,996,020B2 methods are presented wherein one or more sites is allowed to be put into sleep mode if this results in an energy saving. Both methods rely on a database that guarantees that there is no loss in coverage loss. The coverage requirement can be supplied through cell planning or through reports from wireless devices. Moreover, although U.S. Pat. Nos. 9,030,983B2 and 8,996,020B2 provide information on what sites to shut down to save energy, these documents fail to disclose when to turn the sites on again. As a result thereof, radio access network nodes are switched on again at random. Alternatively, all radio access network nodes are switched on again, and later, radio access network nodes that are not needed are switched off again.

Hence, there is still a need for an improved cell operation in a wireless communications network.

SUMMARY

An object of embodiments herein is to provide efficient cell operation in a wireless communications network.

According to a first aspect there is presented a method for cell operation in a wireless communications network comprising a plurality of cells providing network coverage in the wireless communications network. The method is performed by a network node. The method comprises obtaining information of available cell resources of cells in at least a segment of the wireless communications network, and the current operation state of each cell in the segment. The method comprises obtaining a current traffic demand in the segment. The method comprises obtaining previously stored spatial channel characteristics for wireless devices being associated with the cells in the segment. The spatial channel characteristics for at least one wireless device of the wireless device is given between the at least one wireless device and at least two cells in the segment. The method comprises determining whether to affect the operation state of at least one of the cells or not according to the information of available cell resources, the current traffic demand, and the previously stored spatial channel characteristics.

According to a second aspect there is presented a network node for cell operation in a wireless communications network comprising a plurality of cells providing network coverage in the wireless communications network. The network node comprises processing circuitry. The processing circuitry is configured to cause the network node to obtain information of available cell resources of cells in at least a segment of the wireless communications network, and the current operation state of each cell in the segment. The processing circuitry is configured to cause the network node to obtain a current traffic demand in the segment. The processing circuitry is configured to cause the network node to obtain previously stored spatial channel characteristics for wireless devices being associated with the cells in the segment. The spatial channel characteristics for at least one wireless device of the wireless device is given between the at least one wireless device and at least two cells in the segment. The processing circuitry is configured to cause the network node to determine whether to affect the operation state of at least one of the cells or not according to the information of available cell resources, the current traffic demand, and the previously stored spatial channel characteristics.

According to a third aspect there is presented a network node for cell operation in a wireless communications network comprising a plurality of cells providing network coverage in the wireless communications network. The network node comprises an obtain module configured to obtain information of available cell resources of cells in at least a segment of the wireless communications network, and the current operation state of each cell in the segment. The obtain module is further configured to obtain a current traffic demand in the segment. The obtain module is further configured to obtain previously stored spatial channel characteristics for wireless devices being associated with the cells in the segment. The spatial channel characteristics for at least one wireless device of the wireless device is given between the at least one wireless device and at least two cells in the segment. The network node comprises a determine module configured to determine whether to affect the operation state of at least one of the cells or not according to the information of available cell resources, the current traffic demand, and the previously stored spatial channel characteristics.

According to a fourth aspect there is presented a network node for cell operation in a wireless communications network comprising a plurality of cells providing network coverage in the wireless communications network. The network node comprises a processing circuitry. The network node comprises a computer program product. The computer program product stores instructions that, when executed by the processing circuitry, causes the network node to perform a method according to the first aspect.

According to a fifth aspect there is presented a computer program for cell operation in a wireless communications network comprising a plurality of cells providing network coverage in the wireless communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored.

Advantageously this method and network node provide efficient cell operation in a wireless communications network.

Advantageously this method and network node enable energy savings in the communications network.

Advantageously this method and network node are suitable for communications network that are continuously expanded with more cells and frequency spectrum being added.

Advantageously this method and network node are robust in that the coverage estimation can be used in together with automatic cell optimization algorithms, such as reconfigurable antenna system—self-organizing network (RAS-SON) schemes, without an excess in signaling overhead.

Advantageously this method and network node are robust in that the spatial channel characteristics does not need to be recreated when determining whether to affect the operation state of at least one of the cells or not (which otherwise would lead to a dramatic increase in signaling overhead). Moreover, the spatial channel characteristics can ensure that coverage is guaranteed to all locations where wireless devices have been used historically, and not only for locations predefined in drive tests. Furthermore, since the spatial channel characteristics describes the propagation conditions to possible locations of the wireless devices, the spatial channel characteristics is sufficient for evaluating the network coverage, and thus location reports of the wireless devices are not necessary.

Advantageously, by only utilizing as many cells as needed for supplying the demanded capacity, this may decrease the interference and hence improve the performance of the communications network.

Advantageously this method and network node are efficient for finding which network nodes in the communications network that are best suited for being switched on (woken up) when network traffic is increasing.

Advantageously this method and network node enable cell-shape changes of cells of surrounding a cell to be switched off, which in turn may increase the number of possible radio access network nodes to put into sleep mode when not used, which in turn increases possible power savings.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
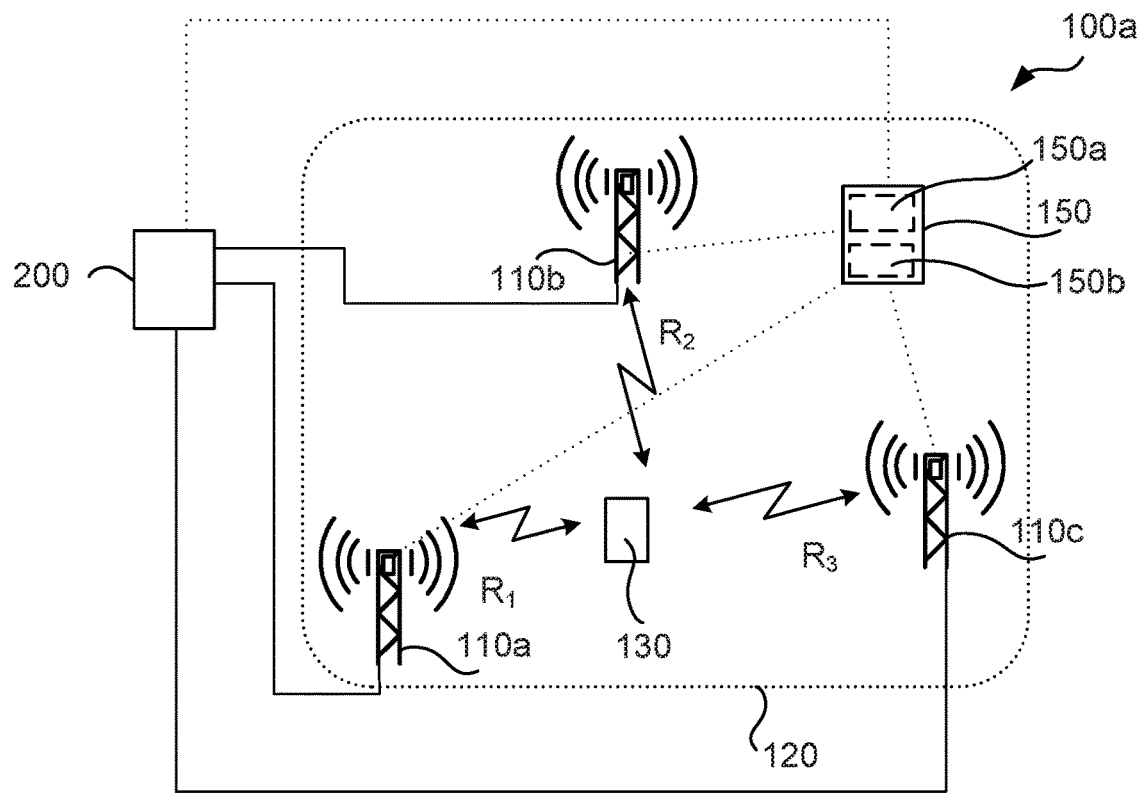
FIGS. 1a-1c are schematic diagrams illustrating a communication network according to embodiments.

FIG. 1*a* is a schematic diagram illustrating a communications network 100*a* where embodiments presented herein can be applied. The communications network 100*a* comprises sites 110*a*, 110*b* 110*c*. Each site 110*a*, 110*b* 110*c* may be represented by a radio access network node (RANN). Hereinafter the terms site, radio access node, and RANN will be used interchangeably. The RANNs may be any combination of radio base stations such as base transceiver stations, node Bs, and/or evolved node Bs. The sites 110*a*, 110*b* 110*c* may further be any combination of macro sites, and micro, or pico, sites. Each 110*a*, 110*b* 110*c* provides network coverage in a respective coverage region (see, FIG. 1*b*) by transmitting transmission beams R1, R2, R3 in that coverage region. Each such coverage region forms a cell. Hence, the wireless communications network 100*a*, may regarded as a cellular wireless communications network. Each site 110*a*, 110*b* 110*c* is assumed to be operatively connected to a core network. The core network may in turn be operatively connected to a service and data providing wide area network. Each site 110*a*, 110*b* 110*c* may further be operatively connected to at least one database 150, 150*a*, 150*b*. The database 150 may be separated into a coverage database 150*a* and a cell state database 150*b*.

The sites 110*a*, 110*b* 110*c* may further be operatively connected to a network node 200. The network node 200, which may be a centralized network node, will be further disclosed below.

Hence, a wireless device 130 served by one of the sites 110*a*, 110*b* 110*c* may thereby access services and data as provided by the wide area network. The wireless devices 130 may be any combination of mobile stations, mobile phones, handsets, wireless local loop phones, user equipment (UE), smartphones, laptop computers, tablet computers, sensors, wireless modems, etc.

Figure 1B:
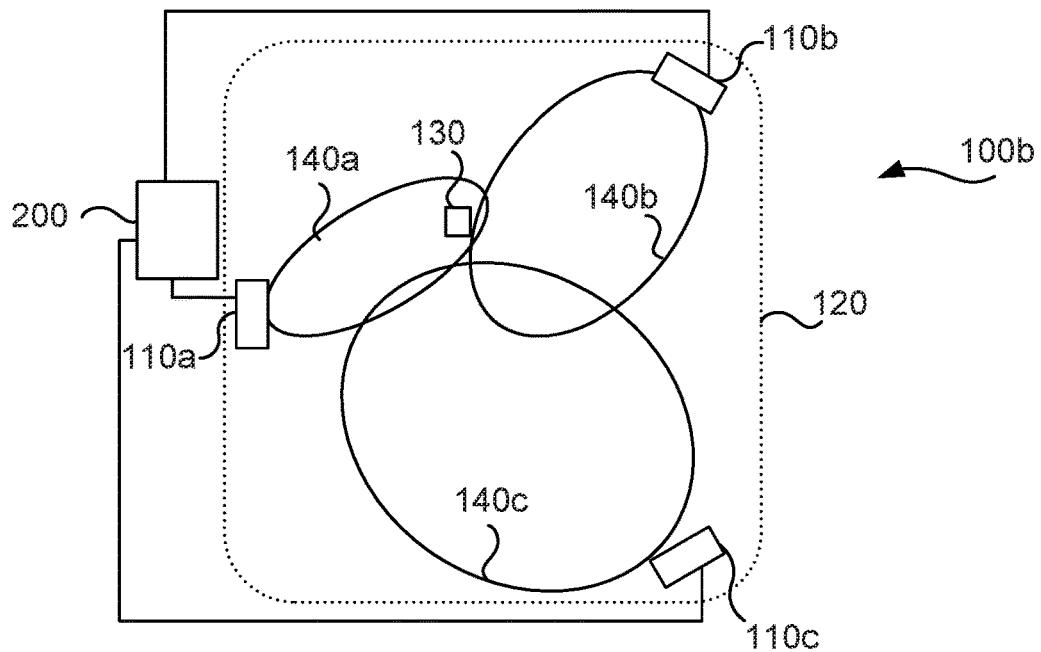

FIG. 1*b* is another schematic diagram illustrating a communications network 100*b* where embodiments presented herein can be applied. The communications network 100*b* of FIG. 1*b* is similar to the communications network 100*a* of FIG. 1*a* but differs that in the illustrative example of FIG. 1*b* the coverage regions, or cells 140*a*, 140*b*, 140*c* of each site 110*a*, 110*b* 110*c* have been schematically illustrated. Each cell 140*a*, 140*b*, 140*c* can be shaped by applying beam forming parameters at the RANN of each site 110*a*, 110*b* 110*c*.

Figure 1C:
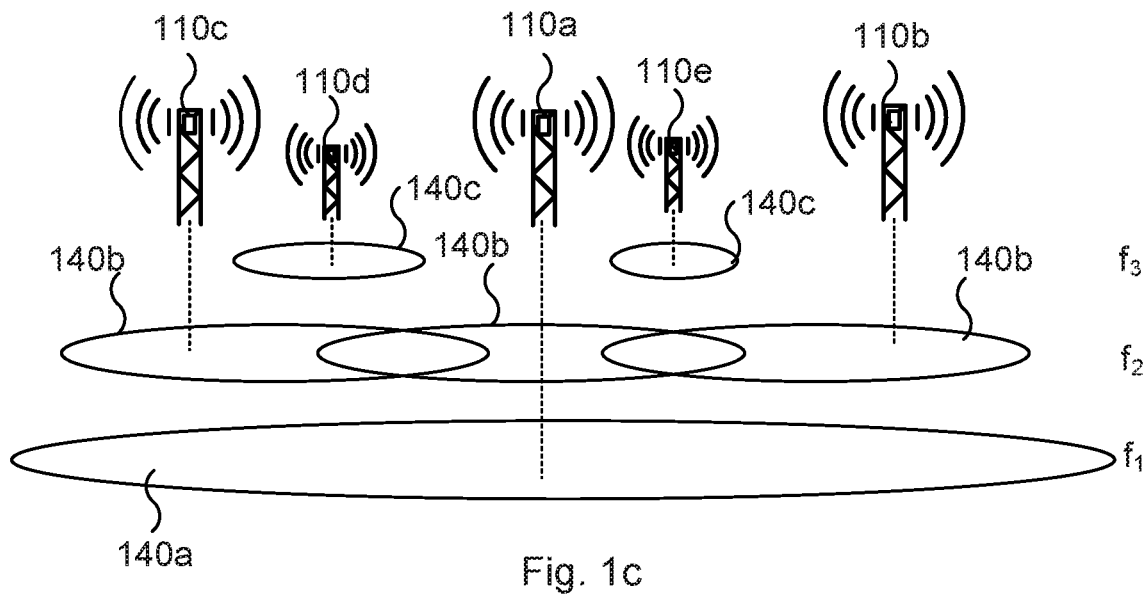

FIG. 1*c* is another schematic diagram illustrating a communications network 100*c* where embodiments presented herein can be applied. The communications network 100*c* of FIG. 1*c* comprises sites 110*a*-110*e*. As noted above, in FIG. 1*c* site 110*a* is configured to provide network coverage in a first cell 140*a* on a first carrier frequency f1 and in a second cell 140*b* on a second carrier frequency f2; sites 110*b* and 110*c* are configured to provide network coverage in a respective further second cells 140*b* on the second carrier frequency f2; and sites 110*d* and 110*e* are configured to provide network coverage in a respective third cell 140*c* on a third carrier frequency f3.

Sites 110*d* and 110*e* can be switched off when the traffic is low since network coverage can be provided for cells 140*c* by sites 110*a*, 110*b*, and 110*c*, assuming that the served wireless devices 130 are configured for transmission and reception on at least one of the carrier frequencies f1 and f2. Furthermore, sites 110*b* and 110*c* can be switched off in case of even lower network load, since network coverage can be provided by site 110*a*, assuming that the served wireless devices 130 are configured for transmission and reception on carrier frequency f1.

As noted above, existing methods disclose one or more sites to be allowed to be put into sleep mode if this results in an energy saving. The methods rely on a database that guarantees that there is no loss in coverage loss. The coverage requirement can be supplied through cell planning or through reports from wireless devices. However, although information on what sites to shut down to save energy can be available, there is no information regarding when to turn the sites on again. As a result thereof, radio access network nodes are switched on again at random. Alternatively, all radio access network nodes are switched on again, and later, radio access network nodes that are not needed are switched off again.

Further, existing methods to obtain coverage knowledge suitable for energy optimizations are costly and have limited validity in the sense that propagation and the spatial distributions of the wireless devices are not trivial to predict. With reference to the illustrative example of FIG. 1*c* it is hence not trivial to assess to what extent the coverages of the different cells 140*a*, 140*b*, 140*c* provided by the sites 110*a*-110*e* overlap. Furthermore, in systems employing adaptive antenna tuning functionality, such as RAS-SON, the coverage relation between sites changes over time and measurement databases becomes outdated and therefore need to be recreated whenever the network settings have been changed.

This leads to a need for an improved cell operation in a wireless communications network 100*a*, 100*b*, 100*c*.

The embodiments disclosed herein relate to cell operation in a wireless communications network 100*a*, 100*b*, 100*c*. In order to obtain cell operation there is provided a network node 200, a method performed by the network node 200, a computer program product comprising code, for example in the form of a computer program, that when run on a network node 200, causes the network node 200 to perform the method.

Figure 2A:
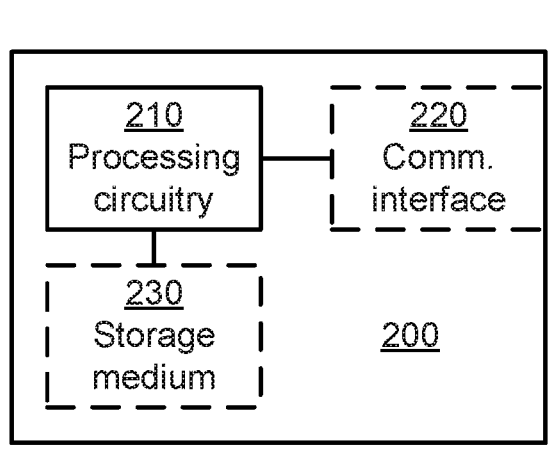
FIG. 2a is a schematic diagram showing functional units of a network node according to an embodiment.

FIG. 2*a* schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S116. These operations, or steps, S102-S116 will be disclosed below. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 for communications with at least one site 110a, 110b, 110c, and at least one database 150, 150a, 150b. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 2B:
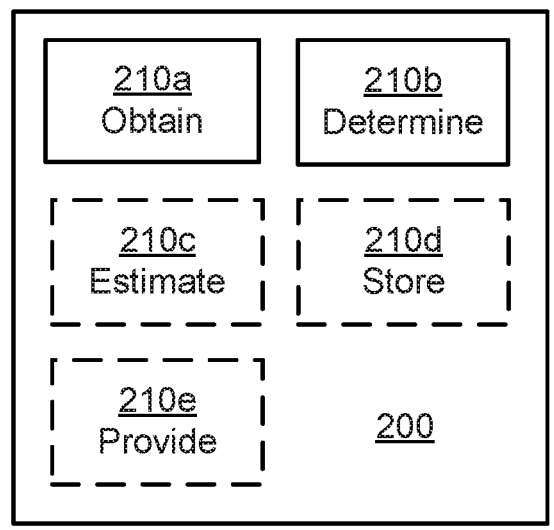
FIG. 2b is a schematic diagram showing functional modules of a network node according to an embodiment.

FIG. 2b schematically illustrates, in terms of a number of functional modules, the components of a network node 200 according to an embodiment. The network node 200 of FIG. 2b comprises a number of functional modules; an obtain module 210a configured to perform below steps S102, S104, S106, and a determine module 210b configured to perform below steps S108, S108b. S108c. The network node 200 of FIG. 2b may further comprises a number of optional functional modules, such as any of an estimate module 210c configured to perform below step S108a, a store module 210d configured to perform below steps S110, S112, and a provide module 210e configured to perform below steps S114, S116. The functionality of each functional module 210a-210e will be further disclosed below in the context of which the functional modules 210a-210e may be used. In general terms, each functional module 210a-210e may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with functional units 220 and/or 230. The processing circuitry 210 may thus be configured to from the storage medium 230 fetch instructions as provided by a functional module 210a-210e and to execute these instructions, thereby performing any steps as will be disclosed hereinafter.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cells 140a, 140b, 140c than instructions that are not required to be performed in real time. In this respect, at least part of the network node 200 may reside in the radio access network, such as in the radio access network node.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210e of FIG. 2b and the computer program 320 of FIG. 3 (see below).

Figure 3:
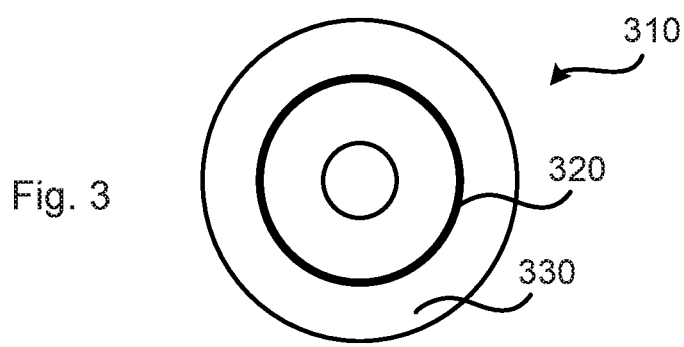
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
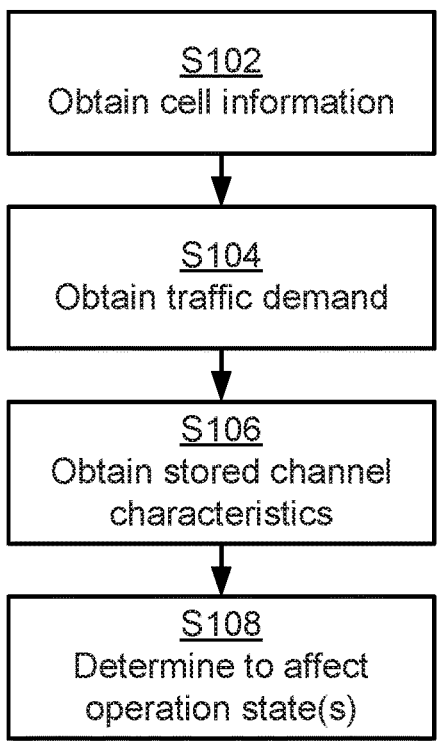
FIGS. 4-7 are flowcharts of methods according to embodiments.
Figure 5:
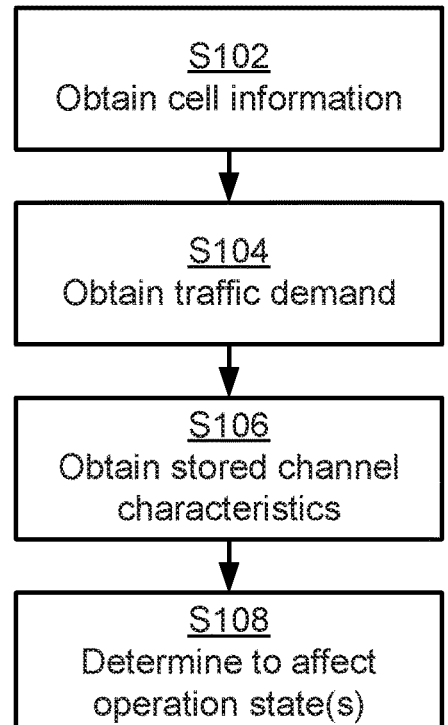
Figure 5:
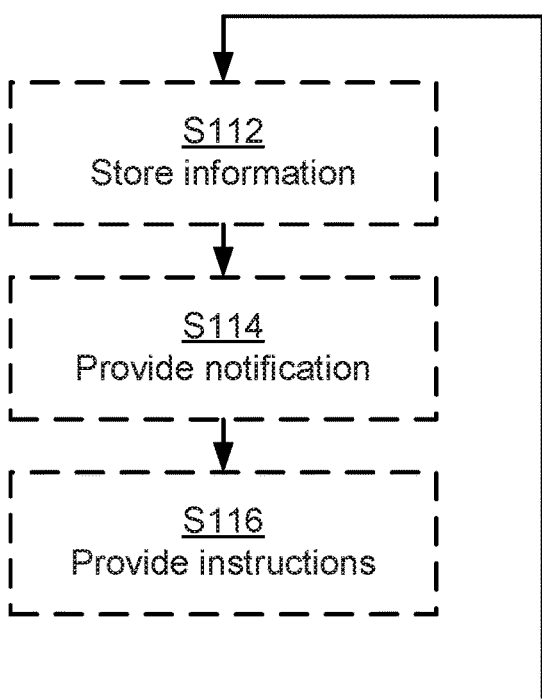

FIGS. 4 and 5 are flow chart illustrating embodiments of methods for cell operation in a wireless communications network 100a, 100b, 100c. The wireless communications network 100a, 100b, 100c comprises a plurality of cells 140a, 140b, 140c. The plurality of 140a, 140b, 140c provide network coverage in the wireless communications network 100a, 100b, 100c. The methods are performed by the network node 200. The methods are advantageously provided as computer programs 320.

Reference is now made to FIG. 4 illustrating a method for insert purpose as performed by the network node 200 according to an embodiment.

The network node 200 is configured to, in a step S102, obtain information of available cell resources of cells 140a, 140b, 140c in at least a segment 120 of the wireless communications network 100a, 100b, 100c, and information of the current operation state of each cell in the segment. In this respect the obtain module 210a can comprise instructions that when executed by the network node 200 causes the processing circuitry 210, possibly in conjunction with the communications interface 220 and the storage medium 230, to obtain this information in order for the network node 200 to perform step S102.

The network node 200 is configured to, in a step S104, obtain a current traffic demand in the segment 120. In this respect the obtain module 210a comprise instructions that when executed by the network node 200 causes the processing circuitry 210, possibly in conjunction with the communications interface 220 and the storage medium 230, to obtain this current traffic demand in order for the network node 200 to perform step S104.

The network node 200 is configured to, in a step S106, obtain previously stored spatial channel characteristics for wireless devices 130 being associated with the cells 140a, 140b, 140c in the segment 120. The spatial channel characteristics for at least one wireless device 130 of the wireless device 130 is given between the at least one wireless device 130 and at least two cells 140a, 140b, 140c in the segment 120. In this respect the obtain module 210a comprise instructions that when executed by the network node 200 causes the processing circuitry 210, possibly in conjunction with the communications interface 220 and the storage medium 230, to obtain the previously stored spatial channel characteristics in order for the network node 200 to perform step S106.

The network node 200 is configured to, in a step S108, determine whether to affect the operation state of at least one of the cells 140a, 140b, 140c or not according to the information of available cell resources, the current traffic demand, and the previously stored spatial channel characteristics. In this respect the determine module 210b can comprise instructions that when executed by the network node 200 causes the processing circuitry 210, possibly in conjunction with the communications interface 220 and the storage medium 230, to perform this determination in order for the network node 200 to perform step S108.

Embodiments relating to further details of cell operation in a wireless communications network 100a, 100b, 100c will now be disclosed.

There may be different ways to provide the cells 140a, 140b, 140c in the communications network 100a, 100b, 100c. For example, the cells 140a, 140b, 140c can be provided by at least one radio access network node, or site, 110a, 110b, 110c, 110d, 110e in the communications network 100a, 100b, 100c. Each cell can be provided by a respective radio access network node, or site, 110a, 110b, 110c, 110d, 110e (such as in the scenarios of FIGS. 1a and 1b). Alternatively, one radio access network node, or site, 110a, 110b, 110c, 110d, 110e provides at least two cells 140a, 140b, 140c (such as in the scenario of FIG. 1c).

There may be different ways to obtain the previously stored spatial channel characteristics. For example, the previously stored spatial channel characteristics may be provided in a database 150. In short, the database 150 comprises spatial information of the propagation channel between each wireless device 130 and at least two cells 140a, 140b, 140c, such that it is possible to determine estimates of received power at wireless device positions for hypothetical (transmission) beamforming weights for multiple frequencies. As a first example, the previously stored spatial channel characteristics can represent spatial channel characteristics having been measured at initial access of the wireless device 130, or periodically, or aperiodically. As a second example, the spatial channel characteristics can be based on sounding reference signals (SRS), demodulation reference signals (DMRS), uplink random-access channel (UL RACH) signals, channel state information reference signal (CSI-RS), or reference signal received power (RSRP) signals. As a third example, each one of the spatial channel characteristics can comprise a spatial relation between at least one of the wireless devices 130 and at least one site 110a, 110b, 110c, 110d, 110e in the segment 120 of the communications network 100a, 100b, 100c. As a fourth example the spatial channel characteristics can be spatial channel characteristics of at least some wireless devices 130 no longer served by any of the cells 140a, 140b, 140c in the segment 120 when the spatial channel characteristics are obtained by the network node 200. As a fifth example the spatial channel characteristics can relate to at least one of a pointing direction for radio waves transmitted or received by the sites 110a, 110b, 110c, 110d, 110e of the cells in the segment 120, channel correlation or covariance matrices determined from uplink measurements, and signal strength estimates over multiple antenna elements or beam forms. As disclosed above, spatial channel characteristics for at least one wireless device 130 of the wireless device 130 is given between the at least one wireless device 130 and at least two cells 140a, 140b, 140c in the segment 120. In this respect the spatial channel characteristics may have been measured between the wireless device 130 and at least two cells 140a, 140b, 140c in the segment 120. Alternatively, the spatial channel characteristics may have been measured between the wireless device 130 and only one single cell 140a, 140b, 140c in the segment 120 and estimated, based on the measurements to the one single cell, to at least one other cell in the segment 120. One non-limiting example of where the spatial channel characteristics may be measured between the wireless device 130 and only one single cell 140a, 140b, 140c in the segment 120 is where one single site provides at least two cells and where the spatial channel characteristics is measured between the wireless device 130 and only one of these cells 140a, 140b, 140c of the site and estimated for at least one of the remaining cells of the same site. However, more advanced techniques could also be applied to estimate the spatial channel characteristics. Hence, only explicit measurements to a single cell is needed in order to provide spatial channel characteristics between one wireless device 130 and at least two cells 140a, 140b, 140c in the segment 120.

The content of the coverage database 150a can be used to assess network coverage for at least a segment 120 of the communications network 100a, 100b, 100c for a set of different cell shapes. The network node 200 is thereby enabled to determine which cell or cells 140a, 140b, 140c that may be switched off to save energy and also to determine the best possible cell shapes to use in the cell or cells 140a, 140b, 140c that remain switched on to ensure as good network coverage as possible.

There may be different examples of available cell resources of the cells 140a, 140b, 140c in the segment 120 of the wireless communications network 100a, 100b, 100c. As an example, the available cell resources can be provided as cell coverage region, cell traffic capacity, cell power consumption, and cell inter-cell interference level.

There may be different ways to affect the operation state of at least one of the cells 140a, 140b, 140c. According to an embodiment, affecting the operation state comprises expanding or decreasing a coverage region of at least one cell 140a, 140b, 140c by means of beamforming. Hence, the network node 200 may be configured to provide instructions to at least one of the sites 110a, 110b, 110c, 110d, 110e to perform beamforming. Hence, the switching on or off of at least one of the cells 140*a*, 140*b*, 140*c* may possibly be combined with adapting cell shapes by means of directional beams that are used for transmitting cell-defining signals, such as cell-specific reference signals or similar at the neighboring sites. Updating/changing the cell shapes of neighboring cells 140*a*, 140*b*, 140*c* may allow for a more well-functioning communications network 100*a*, 100*b*, 100*c* even when a few cells have been switched off. Moreover, the changing of cell shapes may allow for a larger number of cells to be switched off, which increases the possible energy savings. According to an embodiment, affecting the operation state comprises switching on or off at least one transmission resource of a cell 140*a*, 140*b*, 140*c*. A transmission resource may correspond to a carrier frequency or a RAT. According to an embodiment, affecting the operation state comprises switching off at least one first cell and switching on at least one second cell so as to replace the at least one first cell. According to an embodiment, affecting the operation state comprises any combination of the above disclosed embodiments.

There may be different ways to switch off and on at least one cell. For example, switching off at least one cell can cause a corresponding at least one site 110*a*, 110*b*, 110*c*, 110*d*, 110*e* to enter a sleep mode. For example, switching on at least one cell can cause a corresponding at least one site 110*a*, 110*b*, 110*c*, 110*d*, 110*e* to enter an active mode. Additionally, in line with the above, switching on or off at least one cell can be defined by switching on or off a carrier frequency or a RAT used in the at least one cell.

Reference is now made to FIG. 5 illustrating methods for cell operation in a wireless communications network 100*a*, 100*b*, 100*c* as performed by the network node 200 according to further embodiments.

There may be different ways to determine whether to affect the operation state of at least one of the cells or in addition to the determination as performed in step S108. For example, the network node 200 can use the previously stored spatial channel characteristics (as stored in database 150) to estimate received power at wireless device positions for different configurations of the cells 140*a*, 140*b*, 140*c*. Hence, according to an embodiment the network node 200 is configured to determine whether to affect the operation state of at least one of the cells or not by, in a step S108*a*, estimate at least one received power value for at least one wireless device 130 of the wireless devices 130 caused by affecting the operation state of at least one of the cells 140*a*, 140*b*, 140*c*. In this respect the estimate module 210*c* can comprise instructions that when executed by the network node 200 causes the processing circuitry 210, possibly in conjunction with the communications interface 220 and the storage medium 230, to estimate the at least one received power value for at least one wireless device 130 of the wireless devices 130 caused by affecting the operation state of at least one of the cells 140*a*, 140*b*, 140*c* in order for the network node 200 to perform step S108*a*. For example, the network node 200 can determine the number of cells 140*a*, 140*b*, 140*c* needed to supply the demanded coverage in the segment and then switching off cells not needed for supplying the demanded coverage in the segment. Hence, according to an embodiment the network node 200 is configured to determine whether to affect the operation state of at least one of the cells or not by, in a step S108*b*, determine the number of cells in the segment needed to provide network coverage for the current traffic demand. In this respect the determine module 210*b* can comprise instructions that when executed by the network node 200 causes the processing circuitry 210, possibly in conjunction with the communications interface 220 and the storage medium 230, to determine the number of cells in the segment needed to provide network coverage for the current traffic demand in order for the network node 200 to perform step S108*b*. The network node 200 is configured to, in response thereto, in a step S108*c*, determine to affect the operating states of the cells in the segment such that only the determined number of cells in the segment are switched on. In this respect the determine module 210*b* can comprise instructions that when executed by the network node 200 causes the processing circuitry 210, possibly in conjunction with the communications interface 220 and the storage medium 230, to determine to affect the operating states of the cells in the segment such that only the determined number of cells in the segment are switched on in order for the network node 200 to perform step S108*c*. The number of cells in the segment needed to provide network coverage for the current traffic demand may be the smallest number of cells in the segment needed to provide network coverage for the current traffic demand. Alternatively, this number is not the smallest number of cells in the segment needed to provide network coverage for the current traffic demand; it may be more advantageous to have two cells provided by one or more low power site than to have one cell provided by a high power site.

The network node 200 may store network settings that result in reasonable network coverage. In general terms, network coverage can be defined as being proportional to received power. Reasonable network coverage may therefore be defined by the at least one received power value as estimated in step S108*a* being above a predefined threshold value. According to an embodiment the network node 200 is therefore configured to, in a step S110, store the at least one received power value (as estimated in step S108*a*) and the operation state being affected only if the at least one received power value is above a predefined threshold value. In this respect the store module 210*d* can comprise instructions that when executed by the network node 200 causes the processing circuitry 210, possibly in conjunction with the communications interface 220 and the storage medium 230, to store the at least one received power value and the operation state being affected in order for the network node 200 to perform step S110.

Further, the network node 200 may access the previously stored spatial channel characteristics (as stored in database 150) to confirm that network coverage is kept at a sufficient level. Hence, the previously stored spatial channel characteristics can by the network node 200 be used to identify possible network coverage losses caused by the operation state of at least one of the cells being affected.

The network node 200 may thus evaluate which cells that may supply backup coverage if a given cell is switched off (which resembles a cell in outage). Thus, whenever a cell has low utilization this cell may only be switched off if there exists backup coverage, i.e. if there will only be a sufficiently small area that may not be covered by the remaining cells that are switched on. Similarly, whenever a cell has too high utilization, and there are one or more cells in the communications network 100*a*, 100*b*, 100*c* that is currently switched off, the network node 200 may use the previously stored spatial channel characteristics (as stored in database 150) to determine which cell (or cells) that is best capable of serving a large part of the wireless devices 130 in the overloaded cell, and hence the best cell (or cell) to be switched on again.

It is envisioned that switching off one or more cells may, at least temporarily, lead to losses in the network coverage. The network node 200 may therefore keep track of any locations in at least the segment 120 of the communications network 100a, 100b, 100c that no longer are in network coverage. Hence, according to an embodiment the network node 200 is configured to, in a step S112, store information of any location affected by the possible network coverage losses at least until this location no longer is affected by the possible network coverage losses. In this respect the store module 210d can comprise instructions that when executed by the network node 200 causes the processing circuitry 210, possibly in conjunction with the communications interface 220 and the storage medium 230, to store information of any location affected by the possible network coverage losses in order for the network node 200 to perform step S112.

That is, for each hypothesis, of switching off a cell, that result in reasonably high coverage, the network node 200 may store the network setting as a state to use later when the load in the cell is low. This may also be done per site. For example, the traffic demand in some cells may have a periodically repeated pattern. In such a case, storing information regarding backup coverage cells, antenna settings of sites, etc., enables cells to be switched off more quickly whenever the traffic demand becomes low again. Any such hypothesis of low traffic in the communications network may be precomputed given the previously stored spatial channel characteristics.

Whenever the load is/becomes small enough (and the capacity in the backup cells is estimated to be sufficient to carry the traffic currently in the cell to be switched off), the cell is switched off (or the output power of the corresponding site is decreased), and the sites of the neighboring cells are informed to let them know that they now constitutes backup coverage for areas larger than they usually covers to avoid that the backup cells are to be switched off. The network node 200 is therefore, according to an embodiment, configured to, in a step S114, provide notification to any sites 110a, 110b, 110c, 110d, 110e of cells neighbouring the at least one cell being switched off that the at least one cell being switched off is to be switched off. In this respect the provide module 210e can comprise instructions that when executed by the network node 200 causes the processing circuitry 210, possibly in conjunction with the communications interface 220 and the storage medium 230, to provide the notification in order for the network node 200 to perform step S114. This may allow these sites to provide backup to the at least one cell being switched off in a timely manner.

Further, the network node 200 is, according to an embodiment, configured to, in a step S116, provide instructions to sites 110a, 110b, 110c, 110d, 110e of the cells in the segment for which the operating state is affected to affect the operating state accordingly. The instructions can be provided according to X2 interface signalling. In this respect the provide module 210e can comprise instructions that when executed by the network node 200 causes the processing circuitry 210, possibly in conjunction with the communications interface 220 and the storage medium 230, to provide the instructions in order for the network node 200 to perform step S116.

For example, the network node 200 may be configured to determine the least number of cells 140a, 140b, 140c, or sites, needed to supply the demanded network coverage in a given communications network 100a, 100b, 100c, or segment 120. All cells 140a, 140b, 140c, or sites not needed for supplying the network coverage at current traffic demand may then be switched off, or put to sleep, to save energy.

Figure 6:
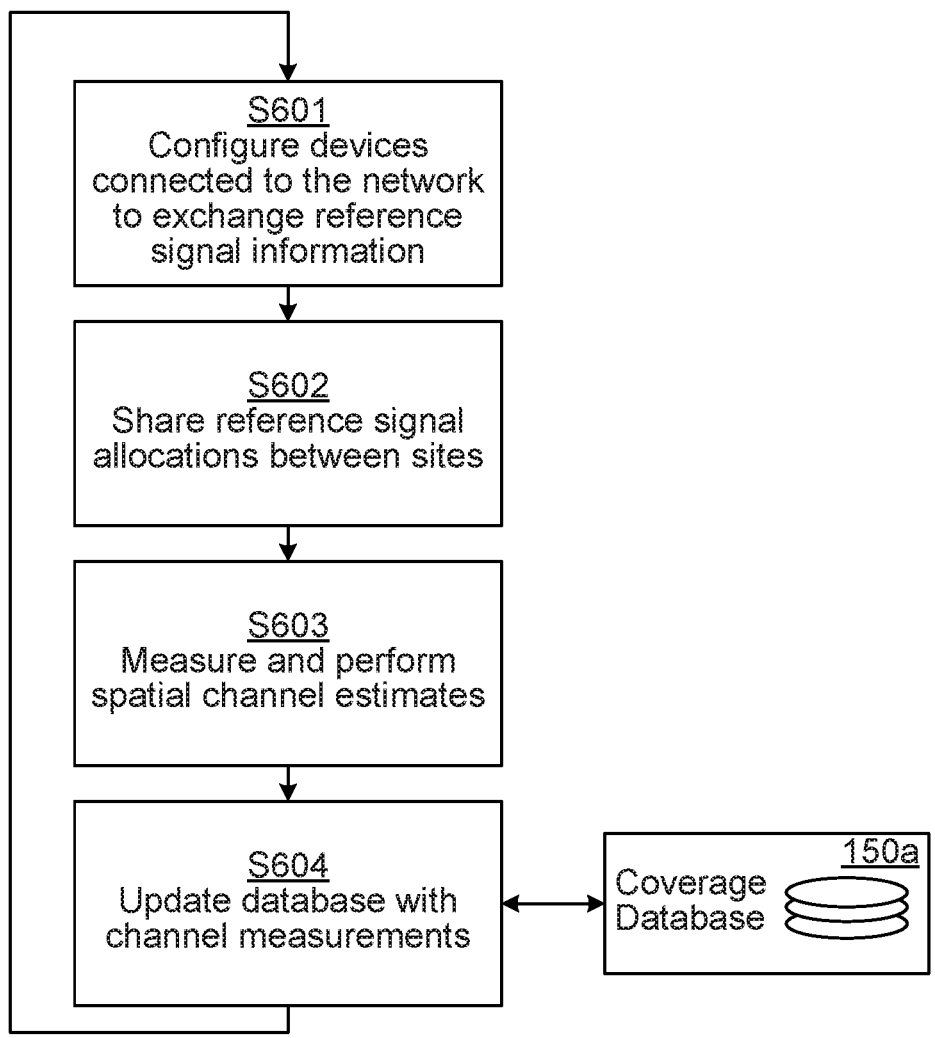

One particular embodiment for updating a database 150 of spatial channel characteristics as performed by the network node 200 based on at least some of the above disclosed embodiments will now be disclosed with reference to the flow chart of FIG. 6.

S601: The network node 200 provides instructions to sites 110a-110c in at least a segment 120 of the communications network 100a, 100b, 100c to configure wireless devices 130 served, in at least one of the cells 140a, 140b, 140c, by the sites 110a-110c in at least the segment 120. The configuration pertains to instruct the wireless devices 130 to exchange reference signal information in cells 140a, 140b, 140c in at least the segment 120. A site 110a-110c that is aware of a reference signal transmission from a wireless device 130 is able to use the known signal to perform a spatial channel estimate.

S602: The network node 200 provides instructions to the sites 110a-110c to share the allocations used for exchanging reference signal information with the wireless devices 130. Spatial channel characteristics to multiple sites may thus be obtained if the sites exchange the reference signal allocations of one or more of its served wireless devices 130 with its neighbor sites.

S603: The network node 200 provides instructions to the sites 110a-110c to measure and perform spatial channel estimates based on the reference signal information exchanged with the wireless devices 130.

The reference signal information may be defined by sounding reference signals transmitted by the wireless devices 130. That is, the sites may configure the wireless devices 130 to so send reference signals in the uplink. Additionally or alternatively, the sites may configure the wireless devices 130 to so receive reference signals (such as channel state information reference signals (CSI-RS) or demodulation reference signals (DRS)) in the downlink and then report measurements of the reference signals in the uplink. The measurements can be performed for multiple carrier frequencies and combined with wireless device measurements representative of pathloss at multiple frequencies, such as reference signal received signal power (RSRP). Further examples of spatial channel characteristics have been provided above.

S604: The network node 200 obtains the spatial channel characteristics for the wireless devices 130 and stores the spatial channel characteristics in the coverage database 150a.

Figure 7:
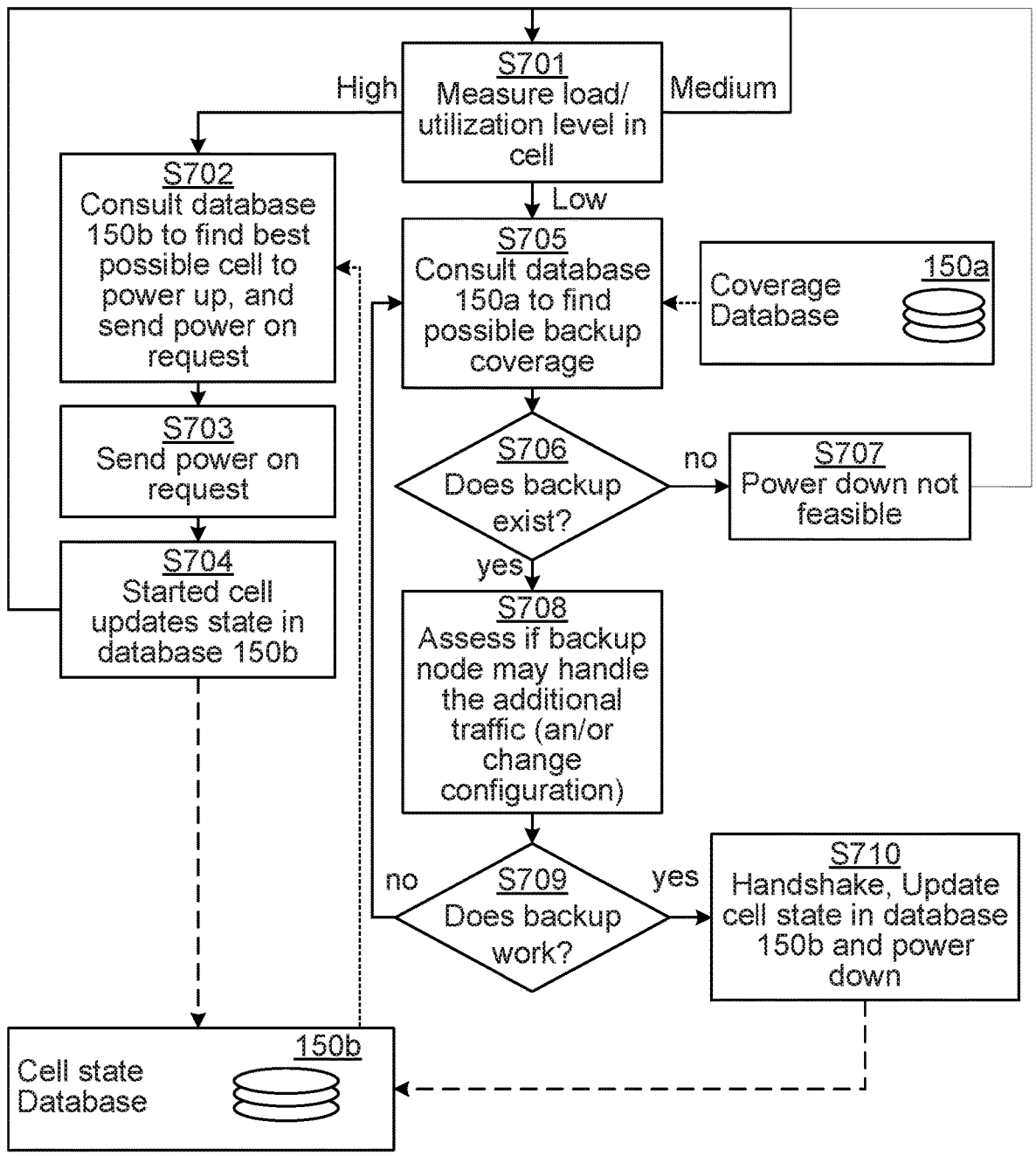

One particular embodiment for cell operation in a wireless communications network 100a, 100b, 100c as performed by the network node 200 based on at least some of the above disclosed embodiments will now be disclosed with reference to the flow chart of FIG. 7. Hence, at least some of above disclosed steps S102-S116 may be implemented in order for the network node 200 to perform the steps of FIG. 7.

S701: The network node 200 continuously measures and tracks network traffic of cells 140a, 140b, 140c at least a segment 120 of the communications network 100a, 100b, 100c. In case of high traffic in at least the segment 120 of the communications network 100a, 100b, 100c step S702 is entered; in case of low traffic step S707 is entered; and in case of medium traffic step S701 is once again entered and new measurements and tracking are performed.

S702: In case of high traffic in at least the segment 120 of the communications network 100a, 100b, 100c the network node 200 accesses cell state database 150b. Particularly, the network node 200 may determine which segment or segments 120 in the communications network 100a, 100b, 100c that has high traffic demand. For this segment or segments 120, the network node 200 evaluates which of any currently switched off cells is best suitable for supplying network coverage to this segment or segments 120. This may for example be the cell that will obtain the larges uptake when switched on. With data accessed from the cell state database 150b the network node 200 thus determines which at least one cell in the communications network 100a, 100b, 100c to switch on (assuming that at least one cell currently is not switched on). The amount of uptake may be determined based on only the currently active cells in the communications network 100a, 100b, 100c, which dynamically powers on the best suited site or sites. This is not always the same site even if the same set of sites is repeatedly put into sleep mode.

S703: The network node 200 provides instructions to the site or sites 110a-110c to switched on the at least once cell identified in step S702. The instructions may be implemented as a power on request and be sent over the X2 interface.

S704: Information that the site or sites 110a-110c identified in step S702 have been instructed to switch on the at least once cell is provided to the cell state database 150b which is updated accordingly.

Steps S702-S704 may thus be performed whenever at least a segment 120 of the communications network 100a, 100b, 100c has high load and there is one or more cells in its vicinity that is currently switched off (or running on lower power).

S705: In case of low traffic in at least the segment 120 of the communications network 100a, 100b, 100c the network node 200 accesses coverage database 150a. The network node 200 identifies which at least once cell that has low utilization. For each of the at least once cell the network node 200 evaluates the resulting coverage with the hypothesis that the cell has been switched off. With data accessed from the coverage database 150a the network node 200 thus determines if at least once cell in the communications network 100a, 100b, 100c exist that can provide backup if another at least once cell in the communications network 100a, 100b, 100c is switched off.

S706: If at least once cell in the communications network 100a, 100b, 100c exist that can provide backup if another at least once cell in the communications network 100a, 100b, 100c is switched off, step S708 is entered, and if not, step S707 is entered.

S707: The network node 200 determines that powering down of at least once cell in the communications network 100a, 100b, 100c is not feasible, and step S701 is once again entered and new measurements and tracking are performed.

S708: The network node 200 determines that powering down of at least once cell in the communications network 100a, 100b, 100c is feasible. The network node 200 further determines whether or not the at least once cell identified in step S705 can provide backup to the at least one cell being switched off, for example taking into account the current traffic, available RATs, and available carrier frequencies, of the at least one cell identified in step S705

S709: If the at least once cell identified in step S705 can provide backup to the at least one cell being switched off, step S710 is entered, and if not, step S705 is entered once again to identify another at least one cell that can provide backup to the at least one cell being switched off, for example taking into account the current traffic, available RATs, and available carrier frequencies, of the another at least one cell.

S710: The network node 200 confirms that the identified at least once cell is to be switched off, possibly by using handshake with the site or sites providing the at least once cell, and information that the site or sites 110a-110c has been instructed to switch off the at least once cell is provided to the cell state database 150b which is updated accordingly.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for cell operation in a wireless communications network comprising a plurality of cells providing network coverage in the wireless communications network, the method being performed by a network node, the method comprising:
    obtaining information of available cell resources of cells in at least a segment of the wireless communications network, and a current operation state of each cell in the segment;
    obtaining a current traffic demand in the segment;
    obtaining previously stored spatial channel characteristics for wireless devices being associated with the cells in the segment, the spatial channel characteristics for at least one wireless device of the wireless devices being given between the at least one wireless device and at least two cells in the segment; and
    determining whether to affect an operation state of at least one of the cells based on the information of available cell resources, the current traffic demand, and the previously stored spatial channel characteristics.

2. The method according to claim 1, wherein determining whether to affect the operation state of the at least one of the cells comprises:
    estimating at least one received power value for at least one wireless device of the wireless devices caused by affecting the operation state of the at least one of the cells.

3. The method according to claim 2, further comprising:
    storing the at least one received power value and the operation state of the at least one of the cells being affected only if the at least one received power value is above a predefined threshold value.

4. The method according to claim 1, wherein the previously stored spatial channel characteristics are used to identify possible network coverage losses caused by the operation state of the at least one of the cells being affected.

5. The method according to claim 4, further comprising:
    storing information of any location affected by the possible network coverage losses at least until the location no longer is affected by the possible network coverage losses.

6. The method according to claim 1, wherein determining whether to affect the operation state of the at least one of the cells comprises:
    determining number of cells in the segment needed to provide network coverage for the current traffic demand; and in response thereto
    determining to affect operating states of the cells in the segment such that only the number of cells in the segment are switched on.

7. The method according to claim 1, wherein affecting the operation state of the at least one of the cells comprises switching on or off at least one transmission resource of a cell.

8. The method according to claim 1, wherein affecting the operation state of the at least one of the cells comprises switching off at least one first cell and switching on at least one second cell so as to replace the at least one first cell.

9. The method according to claim 7, wherein switching off the at least one transmission resource of the cell causes a corresponding at least one site to enter a sleep mode.

10. The method according to claim 7, wherein switching on the at least one transmission resource of the cell causes a corresponding at least one site to enter an active mode.

11. The method according to claim 7, further comprising:
providing notification to any sites of cells neighbouring the at least one cell being switched off that the at least one cell being switched off is to be switched off.

12. The method according to claim 1, wherein affecting the operation state of the at least one of the cells comprises expanding or decreasing a coverage region of at least one cell by means of beamforming.

13. The method according to claim 1, wherein the available cell resources are provided as cell coverage region, cell traffic capacity, cell power consumption, and cell inter-cell interference level.

14. The method according to claim 1, further comprising:
providing instructions to sites of the cells in the segment for which the operating state is affected to affect the operating state accordingly.

15. The method according to claim 14, wherein the instructions are provided according to X2 interface signalling.

16. The method according to claim 1, wherein the cells are provided by at least one radio access network node.

17. The method according to claim 1, wherein the previously stored spatial channel characteristics represent spatial channel characteristics having been measured at initial access of the wireless device, or periodically, or aperiodically.

18. The method according to claim 1, wherein the spatial channel characteristics are based on sounding reference signals (SRS), demodulation reference signals (DMRS), uplink random-access channel (UL RACH) signals, channel state information reference signal (CSI-RS), or reference signal received power (RSRP) signals.

19. The method according to claim 1, wherein each one of the spatial channel characteristics comprises a spatial relation between the at least one wireless device of the wireless devices and at least one site in the segment.

20. The method according to claim 1, wherein the spatial channel characteristics are spatial channel characteristics of at least some wireless devices no longer served by any of the cells in the segment when the spatial channel characteristics are obtained by the network node.

21. The method according to claim 1, wherein the spatial channel characteristics relate to at least one of: a pointing direction for radio waves transmitted or received by sites of the cells in the segment, channel correlation or covariance matrices determined from uplink measurements, and signal strength estimates over multiple antenna elements or beam forms.

22. A network node for cell operation in a wireless communications network comprising a plurality of cells providing network coverage in the wireless communications network, the network node comprising:
processing circuitry; and
memory circuitry connected to the processing circuitry and storing instructions that, when executed by the processing circuitry, cause the network node to:
obtain information of available cell resources of cells in at least a segment of the wireless communications network, and a current operation state of each cell in the segment;
obtain a current traffic demand in the segment;
obtain previously stored spatial channel characteristics for wireless devices being associated with the cells in the segment, the spatial channel characteristics for at least one wireless device of the wireless devices being given between the at least one wireless device and at least two cells in the segment; and
determine whether to affect an operation state of at least one of the cells or not according to the information of available cell resources, the current traffic demand, and the previously stored spatial channel characteristics.

23. A computer program product for cell operation in a wireless communications network comprising a plurality of cells providing network coverage in the wireless communications network, the computer program product comprising a non-transitory computer readable medium storing computer code which, when run on processing circuitry of a network node, causes the network node to:
obtain information of available cell resources of cells in at least a segment of the wireless communications network, and a current operation state of each cell in the segment;
obtain a current traffic demand in the segment;
obtain previously stored spatial channel characteristics for wireless devices being associated with the cells in the segment, the spatial channel characteristics for at least one wireless device of the wireless devices being given between the at least one wireless device and at least two cells in the segment; and
determine whether to affect an operation state of at least one of the cells or not according to the information of available cell resources, the current traffic demand, and the previously stored spatial channel characteristics.

* * * * *